(12) United States Patent
Savian

(10) Patent No.: US 9,132,917 B2
(45) Date of Patent: *Sep. 15, 2015

(54) SEAT SHELL AND INTEGRATED OVERHEAD STORAGE BIN

(71) Applicant: C&D Zodiac, Inc., Huntington Beach, CA (US)

(72) Inventor: Scott Savian, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/028,424

(22) Filed: Sep. 16, 2013

(65) Prior Publication Data

US 2014/0014773 A1     Jan. 16, 2014

Related U.S. Application Data

(63) Continuation of application No. 13/439,787, filed on Apr. 4, 2012, now Pat. No. 8,534,604.

(60) Provisional application No. 61/516,586, filed on Apr. 4, 2011, provisional application No. 61/616,362, filed on Mar. 27, 2012.

(51) Int. Cl.
*B64D 13/00*     (2006.01)
*B64D 11/00*     (2006.01)
*B64D 11/06*     (2006.01)

(52) U.S. Cl.
CPC .............. *B64D 11/003* (2013.01); *B64D 11/06* (2013.01); *B64D 11/0606* (2014.12); *B64D 11/0641* (2014.12); *Y10T 29/49826* (2015.01)

(58) Field of Classification Search
CPC .............................. B64D 11/003; B64D 11/06
USPC ....................................................... 244/118.6
See application file for complete search history.

(56) References Cited

U.S. PATENT DOCUMENTS

| 4,637,642 A | 1/1987 | Stoecker |
| 4,951,560 A | 8/1990 | Setan |

(Continued)

FOREIGN PATENT DOCUMENTS

| JP | 20075122166 | 5/2007 |
| JP | 2008296815 | 11/2008 |
| WO | 2006053367 | 5/2006 |

OTHER PUBLICATIONS

International Search Report and Written Opinion issued on Jun. 22, 2012 for related PCT/US2012/032225.

(Continued)

*Primary Examiner* — Christopher P Ellis
*Assistant Examiner* — Jessica Wong
(74) *Attorney, Agent, or Firm* — Jeffer Mangels Butler & Mitchell LLP; Brennan C. Swain, Esq

(57) ABSTRACT

A lounge assembly configured to be positioned in the interior of an aircraft. The lounge assembly includes a first seat shell configured to at least partially surround a passenger seat, and an overhead storage bin assembly. The overhead storage bin assembly includes first and second posts configured to be secured to a floor of the aircraft, and an overhead bin housing supported by the first and second posts. The overhead bin housing includes at least a first overhead storage bin that is positioned generally above the first seat shell.

15 Claims, 9 Drawing Sheets

(56) References Cited

U.S. PATENT DOCUMENTS

| | | |
|---|---|---|
| 5,567,028 A | 10/1996 | Lutovsky |
| 5,716,026 A | 2/1998 | Pascasio |
| 5,795,018 A | 8/1998 | Schumacher |
| 6,056,239 A | 5/2000 | Cantu |
| 6,170,786 B1 | 1/2001 | Park |
| 6,237,872 B1 | 5/2001 | Bar-Levav |
| 7,121,510 B2 | 10/2006 | Ritts |
| 7,252,268 B2 | 8/2007 | Saint-Jalmes |
| 7,354,018 B2 | 4/2008 | Saint-Jalmes |
| 7,419,214 B2 | 9/2008 | Plant |
| 7,703,718 B2 | 4/2010 | Saint-Jalmes |
| 7,712,704 B2 | 5/2010 | Saint-Jalmes |
| 8,534,604 B2 * | 9/2013 | Savian ................ 244/118.6 |
| 2007/0102577 A1 | 5/2007 | Saint-Jalmes |
| 2009/0050740 A1 | 2/2009 | Saint-Jalmes |
| 2009/0146004 A1 | 6/2009 | Plant |
| 2009/0283636 A1 | 11/2009 | Saint-Jalmes |
| 2011/0210204 A1 | 9/2011 | Collins |
| 2011/0210205 A1 | 9/2011 | Bock |
| 2011/0253837 A1 | 10/2011 | Lee |

OTHER PUBLICATIONS

Office Action issued on Oct. 31, 2014 in Japanese Patent Appln. 2014-503967.

* cited by examiner

SEAT SHELL AND INTEGRATED OVERHEAD STORAGE BIN

This application is a continuation of U.S. patent application Ser. No. 13/439,787, filed Apr. 4, 2012, which claims the benefit of U.S. Provisional Application No. 61/516,586, filed Apr. 4, 2011, and U.S. Provisional Application No. 61/616,362, filed Mar. 27, 2012, which are all herein incorporated by reference in their entireties.

FIELD OF THE INVENTION

The invention relates to passenger seating and storage in the interior of passenger aircraft. In particular, the invention relates to a seat shell and an integrated overhead storage bin.

BACKGROUND OF THE INVENTION

Commercial aircraft, such as the Airbus A320 or Boeing 737 are typically constructed from modular components, the size, weight and construction of which are dictated by many considerations, including fuselage dimensions, aesthetic and safety considerations. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. Commercial passenger aircraft generally include overhead luggage storage bins mounted from the ceiling of the aircraft over the passenger seats. These bins are designed to accommodate the size, shape, and weight of passenger carry-on luggage.

SUMMARY OF THE PREFERRED EMBODIMENTS

Generally, the invention is laterally positioned personal overhead storage space (such that it opens toward the front or rear of the aircraft) that is ultimately supported by the floor of an aircraft. Accordingly, in a broadest sense, an embodiment can include a single post, secured to the floor of the aircraft that positions an overhead storage bin above a passenger seat. In another embodiment, the overhead storage bin may be positioned over the passenger seat by the seat shell. The structure that supports the overhead bin may be one or posts, one or more seat shells, walls, monuments, etc.

One of the purposes of the invention is to maximize the number of seats on an aircraft, particularly in a business or first class compartment (however, the invention can also be utilized in economy class), and provide for convenient and easily accessible storage for passengers. The configuration of seats, seat shell design, overhead bin design and configuration each contribute to achieving this purpose while simultaneously providing for passenger convenience, comfort and safety.

In a preferred embodiment, the overhead storage bins make more efficient use of space in the aircraft interior (preferably eliminating closets that require dedicated floor space). In a preferred embodiment, the overhead storage bins are accessible to each passenger without having to invade another passenger's space. As shown in the drawings, the overhead storage bins are placed over the passenger to create a more comfortable, enclosed space. It will be appreciated that the configuration of bin numbers, location and size are flexible and not a limitation on the present invention. For the designers of aircraft, the present invention allows the bin to move with the seat, thereby freeing up the ability to arrange the seats as desired; and the passenger service unit can be placed generally above the passenger and/or in the column that supports the overhead bin as more fully described below.

Overhead storage bin assemblies are well known in the art. For example, see U.S. Pat. No. 4,637,642 issued on Jan. 20, 1987, U.S. Pat. No. 5,567,028 issued on Oct. 22, 1996, and U.S. Patent Publication No. 2011/0253837, published on Oct. 20, 2011, the entireties of which are hereby incorporated by reference. Seat shells are also known in the art. For example, see U.S. Pat. No. 6,170,786 issued on Jan. 9, 2001, U.S. Pat. No. 7,419,214 issued on Sep. 2, 2008, and U.S. Patent Publication No. 2009/0146004, published on Jun. 11, 2009, the entireties of which are hereby incorporated by reference.

In accordance with a first aspect of the present invention, there is provided an aircraft that includes at least a fuselage having an inner side wall and a floor, at least a first seat having an upper portion, at least a first laterally extending overhead storage bin positioned generally above the upper portion of the first seat, and support structure secured to the floor and supporting the first overhead storage bin. The first seat is secured to the floor and the first overhead storage bin has an open and a closed configuration (see FIG. 2). The first overhead storage bin opens toward the front or the rear of the aircraft. In a preferred embodiment, the aircraft also includes a second seat with an upper portion and that is secured to the floor and is adjacent the first seat. The aircraft also includes a second laterally extending overhead storage bin positioned generally above the upper portion of the second seat and adjacent the first overhead storage bin, and support structure secured to the floor and supporting the second overhead storage bin. The second overhead storage bin has an open and a closed configuration and it opens toward the front or the rear of the aircraft. In a preferred embodiment, the first and second overhead storage bins are not secured to the inner side wall of the aircraft.

In accordance with another aspect of the present invention, there is provided a lounge assembly configured to be positioned in the interior of an aircraft. The lounge assembly includes a first seat shell configured to at least partially surround a passenger seat, and an overhead storage bin assembly. The overhead storage bin assembly includes first and second posts configured to be secured to a floor of the aircraft, and an overhead bin housing supported by the first and second posts. The overhead bin housing includes at least a first overhead storage bin that is positioned generally above the first seat shell. In a preferred embodiment, the overhead bin housing includes a second overhead storage bin positioned on one side of the first overhead storage bin and a third overhead storage bin positioned on the opposite side of the first overhead storage bin. When the lounge assembly is positioned in the interior of an aircraft, the first, second and third storage bins face forward. Preferably, the lounge assembly includes a second seat shell positioned on one side of the first seat shell and a third seat shell positioned on the opposite side of the seat shell bin. The second overhead storage bin is positioned generally above the second seat shell and the third overhead storage bin is positioned generally above the third seat shell.

In an embodiment, the overhead bin housing includes fourth, fifth and sixth overhead storage bin assemblies, such that when the lounge assembly is positioned in the interior of an aircraft, the fourth, fifth and sixth storage bins face aft. And, the lounge assembly includes fourth, fifth and sixth seat shells. The fourth overhead storage bin is positioned generally above the fourth seat shell, the fifth overhead storage bin is positioned generally above the fifth seat shell, and the sixth overhead storage bin is positioned generally above the sixth seat shell.

In a preferred embodiment, the lounge assembly includes first and second passenger service units. The first passenger service unit is positioned between the first and second overhead storage bins and the second passenger service unit is positioned between the first and third overhead storage bins. Preferably, the passenger service units include at least one gasper, and a passenger reading light is mounted on at least one of the first and second posts.

In accordance with another aspect of the present invention, there is provided an overhead storage bin assembly configured to be positioned in the interior of an aircraft that includes first and second posts configured to be secured to a floor of the aircraft, and an overhead bin housing supported by the first and second posts. The overhead bin housing includes at least a first overhead storage bin. When the overhead storage bin assembly is positioned in the interior of an aircraft, the first overhead storage bin is positioned generally above a passenger seat.

In accordance with yet another aspect of the present invention, there is provided a method of positioning overhead storage bins within an aircraft interior. The method includes providing a first group of seats and a first group of overhead storage bins, positioning the first group of seats within the aircraft interior such that each of the first group of seats face forwardly, and positioning the first group of overhead storage bins within the aircraft such that each of the first group of overhead storage bins is positioned above one of the first group of seats. The first group of overhead storage bins each face forwardly. In a preferred embodiment, the aircraft interior has a floor and an interior side wall, the first group of seats are each secured to the floor, and the first group of overhead storage bins are supported above the first group of seats by support structure and are not secured to the interior side wall.

In a preferred embodiment, the method further includes providing a second group of seats and a second group of overhead storage bins, positioning the second group of seats within the aircraft interior such that each of the second group of seats face aft, and positioning the second group of overhead storage bins within the aircraft such that each of the second group of overhead storage bins is positioned above one of the second group of seats. The second group of overhead storage bins each face aft. Preferably, the aircraft interior has a floor and an interior side wall, the first group of seats and the second group of seats are each secured to the floor, the first group of overhead storage bins are supported above the first group of seats by support structure and are not secured to the interior side wall and the second group of overhead storage bins are supported above the second group of seats by support structure and are not secured to the interior side wall.

DETAILED DESCRIPTION OF THE PREFERRED EMBODIMENTS

Figure 1:
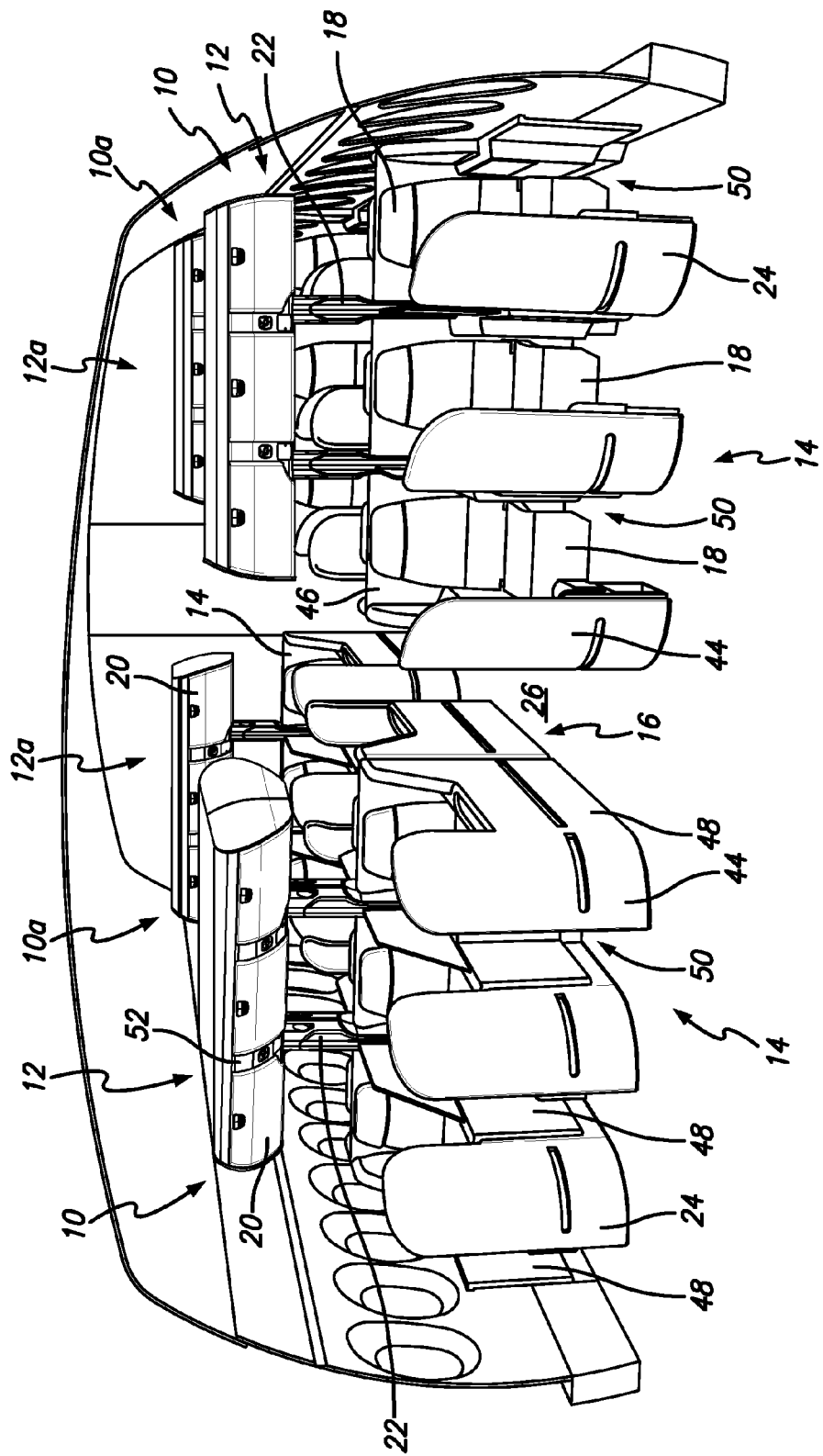
FIG. 1 is a perspective view of the interior of an aircraft first class cabin showing a series of lounge assemblies in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "rear," "end" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-10 show a first embodiment of a lounge assembly 10 that includes a floor mounted overhead bin assembly 12 and a plurality of seat shells 24. FIG. 1 shows a series of lounge assemblies 10 in the first class cabin of an aircraft. The two forward lounge assemblies 10 include a forward facing suite 14 and an aft facing suite 16, and the two aft lounge assemblies 10a include only a forward facing suite 14. For simplicity, most of the description herein focuses on the lounge assembly 10 with both forward and aft facing suites 14 and 16, which includes six seats 18 and six overhead storage bins 20. However, it will be understood that the lounge assembly 10a with only a forward facing suite 14 is essentially half of lounge assembly 10 and includes three seats 18 and three overhead storage bins 20, and typically backs up to a wall. However, this is not a limitation on the present invention. In another embodiment, the aircraft may include a plurality of lounge assemblies 10a with only a forward facing suite 14.

In a preferred embodiment, the forward facing suite 14 and the aft facing suite 16 each include three seats 18, for a total of six seats 18 and six overhead storage bins 20, thereby providing each passenger with their own overhead storage bin 18. In particular, the invention is contemplated for use with seating and overhead storage bins on passenger aircraft. However, this is not a limitation on the present invention and the lounge assembly 10 can be used in other vehicles, such as a bus, automobile, train or the like.

Figure 2:
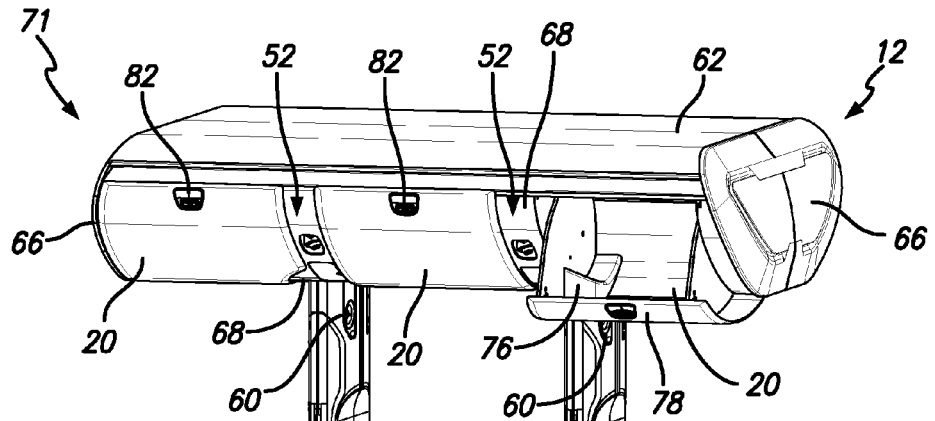
FIG. 2 is a perspective view of a overhead bin assembly in accordance with a preferred embodiment of the present invention.

As is shown in FIG. 2, the overhead storage bin assembly 10 includes posts 22 that support the overhead storage bins 20 and associated components (described below). In a preferred embodiment, the posts 22 include attachment feet 23 that are secured to the existing seat track in an aircraft. However, this is not a limitation and the posts 22, and or attachment feet 23 can be mounted to the aircraft at a point other than the seat track.

Figure 7:
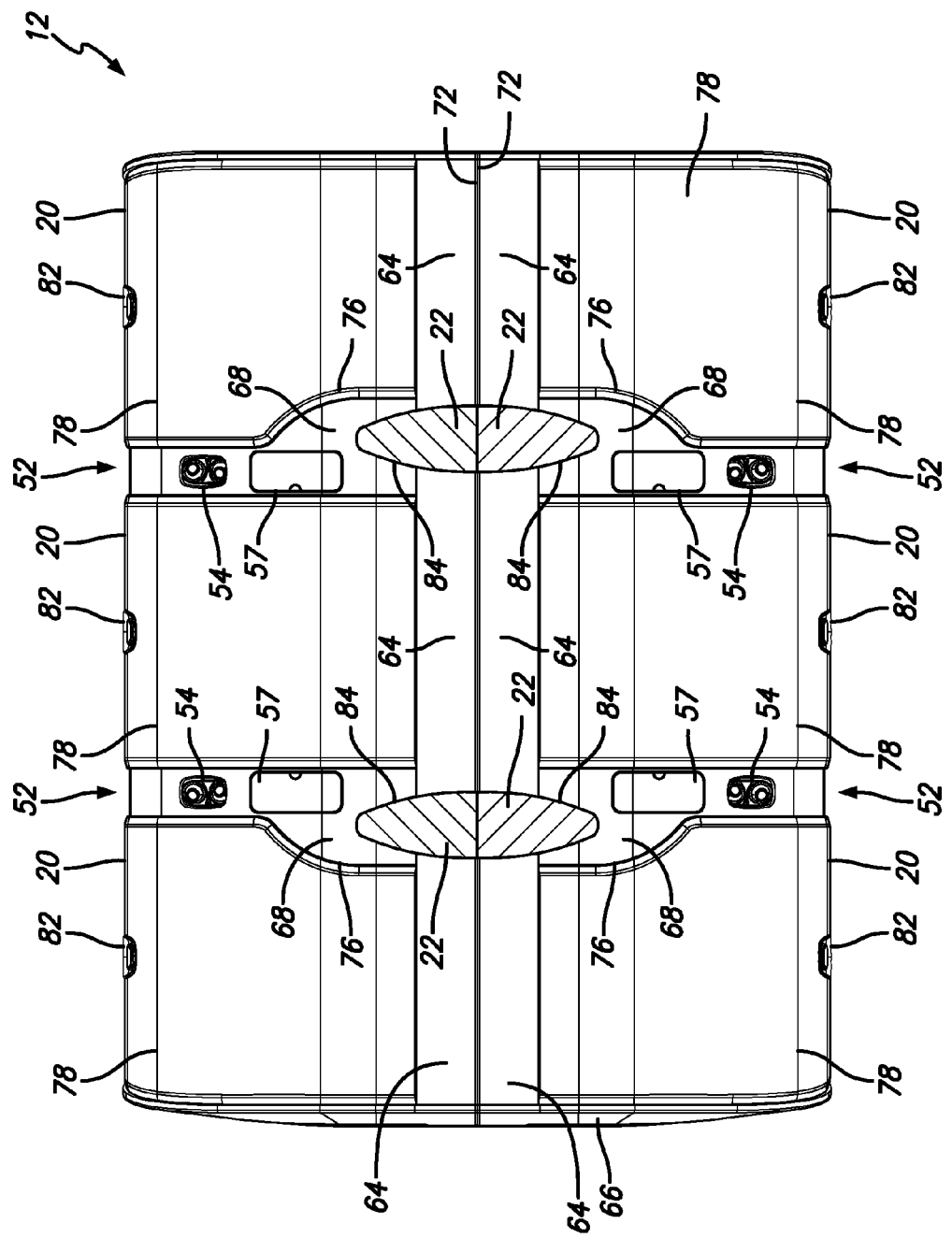
FIG. 7 is a bottom elevational view of the overhead bin assembly of FIG. 2, with the posts in cross-section.
Figure 9:
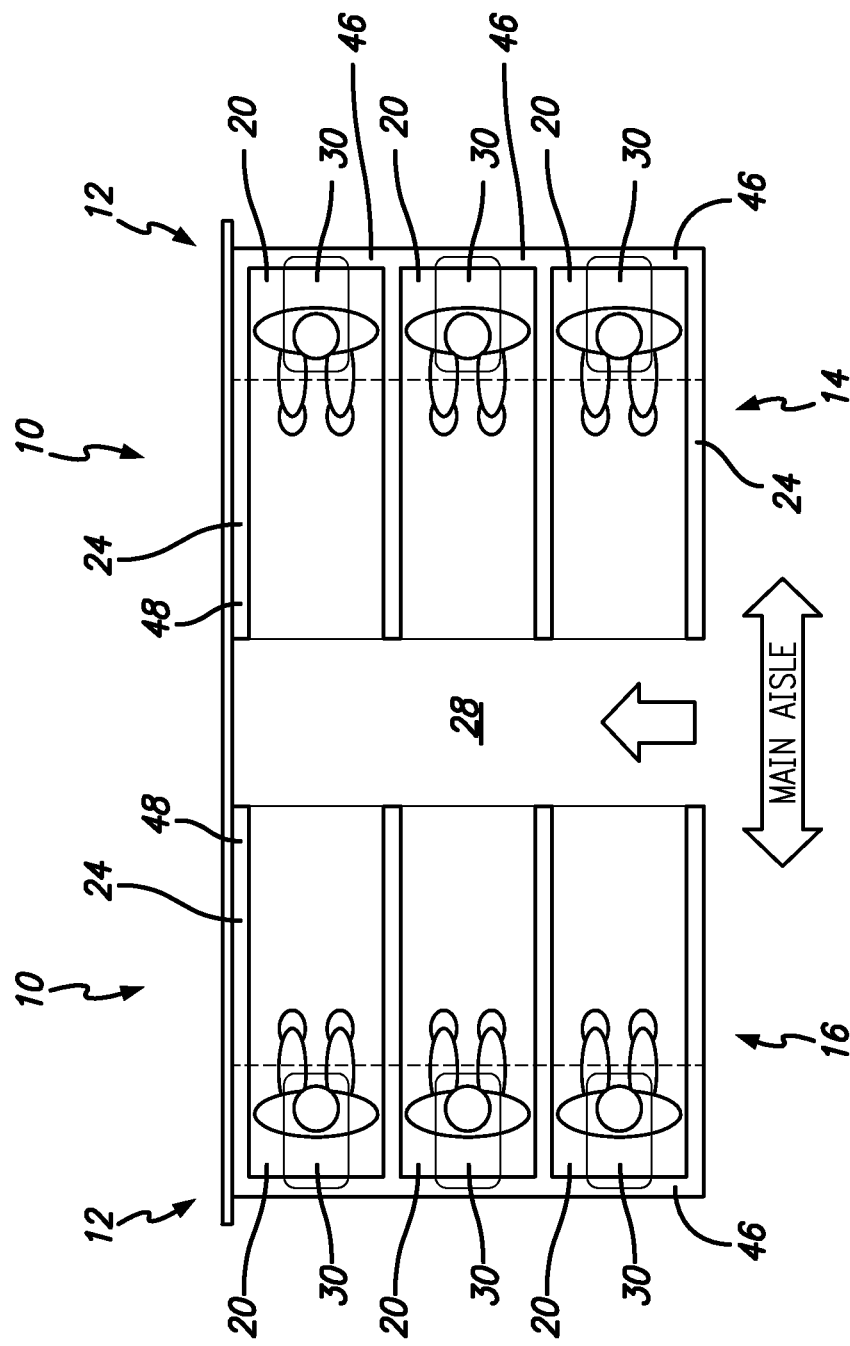
FIG. 9 is a top plan view of a portion of the interior of an aircraft taken along the box labeled 9 in FIG. 8.

In a preferred embodiment, each seat 18 is disposed within a seat shell 24. As shown in FIGS. 7 and 9, the forward facing suite 14 and the aft facing suite 16 each include three seat shells 24 for at least partially surrounding each seat 18. In a preferred embodiment, the posts 22 are secured to the seat shells 24 using mechanical fasteners, such as screws, bolts or the like. In another embodiment, the posts 22 can be secured to the seat shells 24 using rivets, adhesive or any other fastening means known in the art. In another embodiment, the seat shells 24 are not secured to the posts 22. In another embodiment, the posts 22 can be omitted and the seat shells 24 can include high enough walls that the overhead storage bins 20 are secured to and supported by the seat shell(s) 24 (which are secured to the floor). It will be understood that forward facing means that within an aircraft, the overhead storage bins 20 open toward the front of the aircraft and passengers seated in the seats 18 within a seat shell 24 face the front of the aircraft. It will be understood that aft facing means that within an aircraft, the overhead storage bins 20 open toward the rear of the aircraft and passengers seated in the seats 18 within a seat shell 24 face the rear of the aircraft. In other words, the overhead storage bins 20 are positioned laterally across the fuselage of the aircraft, as is shown in FIG. 1.

Figure 8:
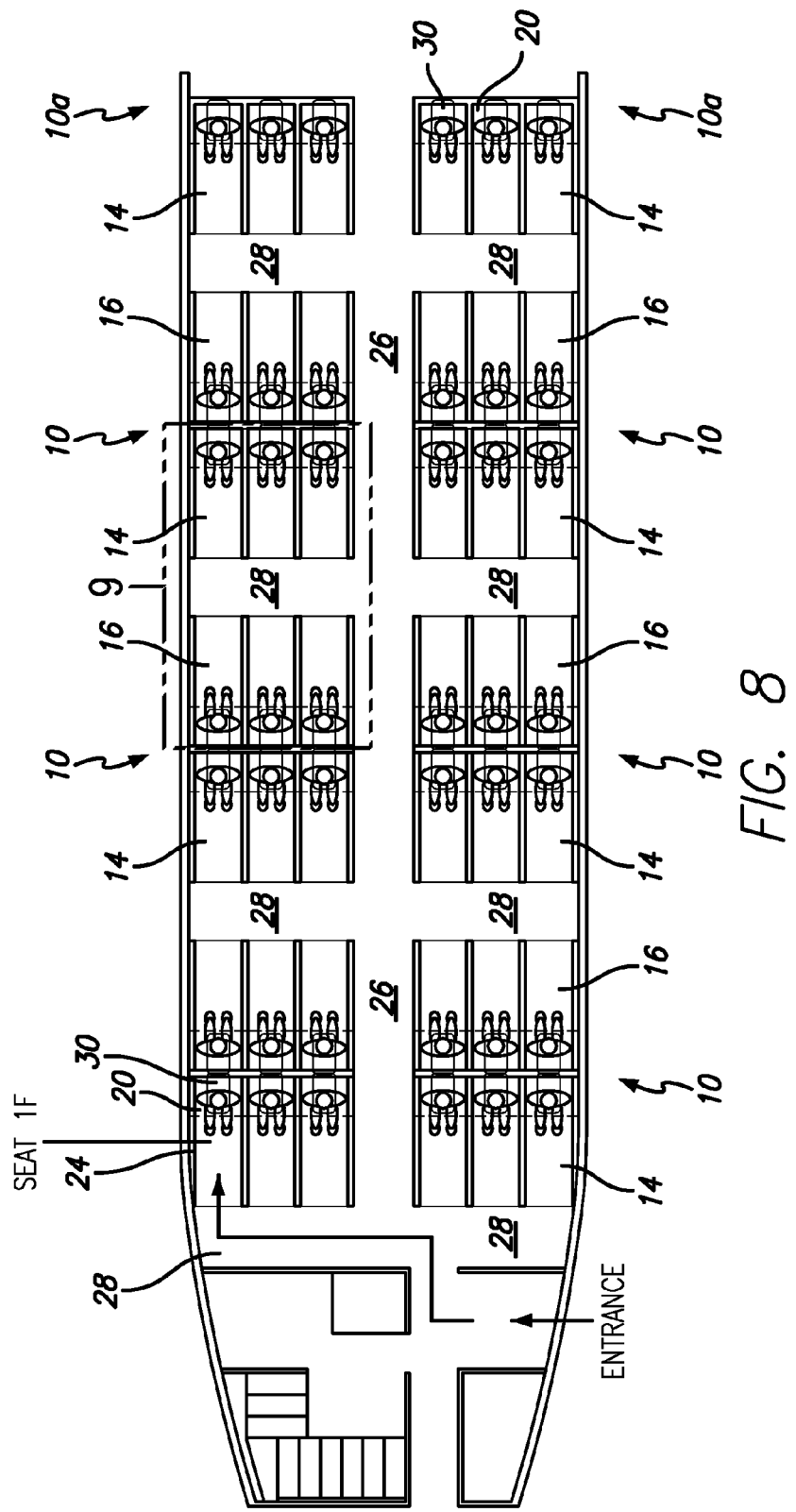
FIG. 8 is a top plan view of a portion of the interior of an aircraft showing a plurality of lounge assemblies in schematic.

FIGS. 8 and 9 show plan views of the interior layout of an aircraft utilizing a plurality of lounge assemblies 10 of the present invention. As shown, the arrangement of the lounge assemblies 10 and 10a and the separation between them provides a single longitudinal main aisle 26 and perpendicular cross aisles 28. The cross aisles 28 provide access for passengers seated in either the aft facing suite 16 or forward facing suite 14 adjacent to the cross aisle 28. Therefore, when passengers enter the cabin, they step into their assigned seat shell before placing their luggage 30 in their personal overhead storage bin 20, instead of holding up the other boarding passengers. For example, as shown in FIG. 7, when the passenger seated in seat 1F enters, in order to get to his overhead storage bin 20, he must step into his seat shell 24. This prevents him from standing in the main aisle 26 and holding up the passengers boarding behind him.

Figure 10:
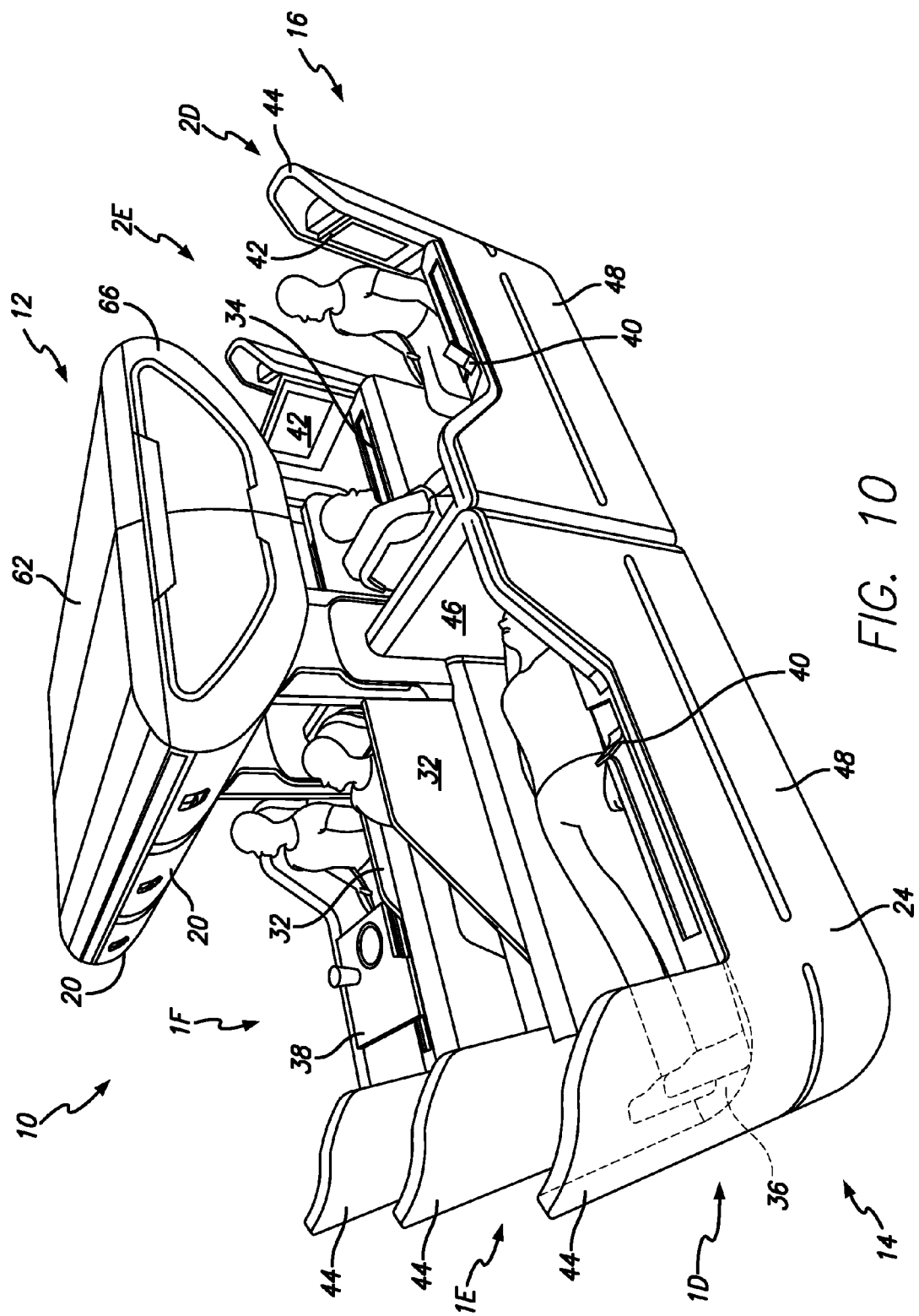
FIG. 10 is a perspective view of one of the lounge assemblies of FIG. 1.

FIG. 10 is a perspective view of a single lounge assembly 10 and illustrates a number of the different features thereof. For descriptive purposes, the five seats that are shown are labeled 1D, 1E, 1F, 2D and 2E. In a preferred embodiment, the lounge assembly 10 includes privacy dividers 32 that raise and lower to provide privacy for adjacent passengers. As will be appreciated, each row of three seats preferably includes two privacy dividers 32. As is shown in FIG. 10, the privacy divider 32 between seats 1D and 1E is up and the privacy divider 32 between seats 1E and 1F is down. In a preferred embodiment, the privacy dividers 32 are housed in a slot 34 and can be raised and lowered by hand. In another embodiment, the privacy dividers 32 can be automated. In another embodiment, each seat can include a privacy divider 32. I.e., the seat adjacent the main aisle 26 can also include a privacy divider 32.

It should be understood by those of ordinary skill in the art that any type of seat is within the present invention. Preferably the seats include an upper portion for supporting the passenger's back and a seat portion. In a preferred embodiment, the seats 18 are fully reclinable seats that allow a passenger to lay prone for sleeping, as shown in seat 1D. Preferably, the seat shell 24 includes a support 36 at the end opposite the seat 18. The support 36 can be used for supporting the sleeping passengers feet in seat 1D or can be used to support a sitting passenger, as shown in seat 2D. With this feature, two passengers can sit within the same seat shell 24 on both the seat 18 and the support 36. In a preferred embodiment, the support 36 is foldable or pivotable such that it can be raised and lowered or at least a part of it can be raised or lowered or otherwise stowed so that it is out of the way when not in use.

As shown in FIG. 10, in a preferred embodiment of the invention, the lounge assembly 10 can also include tray tables 38, docks 40 for electronic devices, such as portable music players, cell phones, tablets, etc. and video/television monitors 42 that are pivotable (see seat 2D vs. seat 2E). In a preferred embodiment, the tray table 38 can be swiveled or pivoted forwardly (within a horizontal plane) so that the passenger can exit the seat shell 24 when the tray table 38 is deployed and out of its stowage compartment in the side wall 48. However, none of these features are a limitation on the present invention and they can be omitted. It will be appreciated by those of ordinary skill in the art that other features and amenities can be included, and such features and amenities are within the scope of the present invention.

In a preferred embodiment, as is best shown in FIGS. 1 and 10, the seat shells 24 each include a front wall 44, rear wall 46, two side walls 48 and an entrance 50. It should be understood that the front and rear walls are described as front and rear herein with respect to the passenger seated therein. It will be appreciated that the side walls 48 between the seats can be separate pieces that are secured together or can be a unitary piece. As will appreciated by those of skill in the art, the seat shells 24 can include other known features and components, such as armrests, seat belts, audio/video controls, storage compartments, pockets and the like.

Referring now to FIGS. 2-6, the overhead bin assembly 12 will now be described. As discussed above, lounge assembly 10 includes six seats 18 and six overhead storage bins 20 and lounge assembly 10a includes three seats 18 and three overhead storage bins 20. Likewise, overhead bin assembly 12 includes six overhead storage bins and overhead bin assembly 12a includes three overhead storage bins. For simplicity, the description herein focuses on overhead bin assembly 12. However, it will be understood that overhead bin assembly 12a is essentially half of overhead bin assembly 12.

Figure 3:
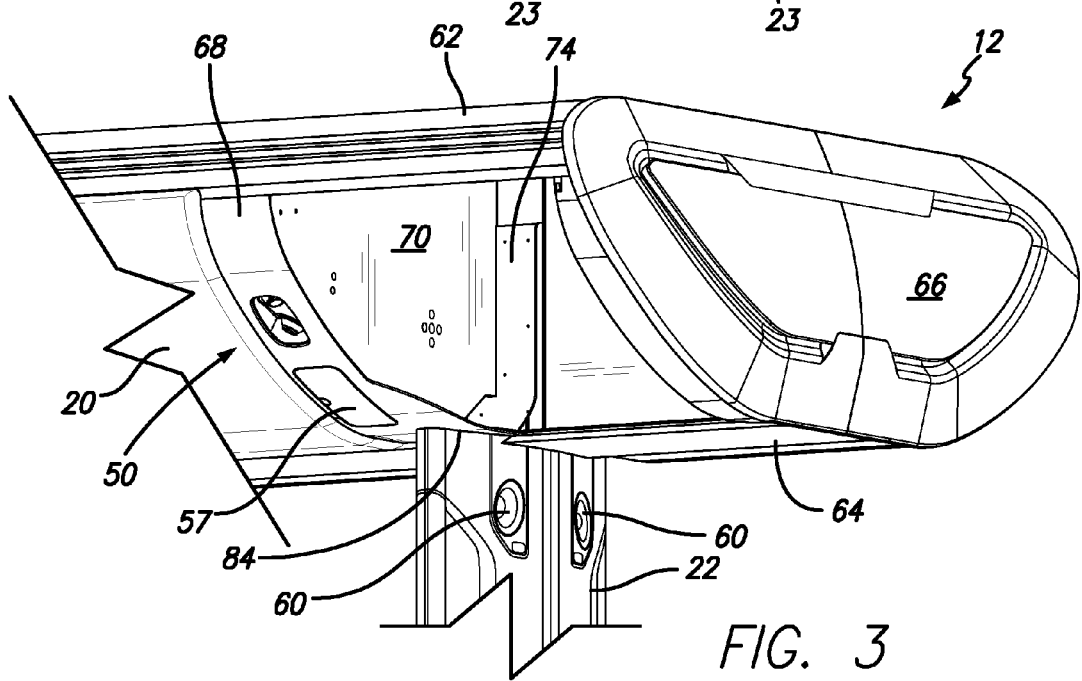
FIG. 3 is a perspective view of a portion of the overhead bin assembly of FIG. 2, with one of the overhead storage bins removed.
Figure 4:
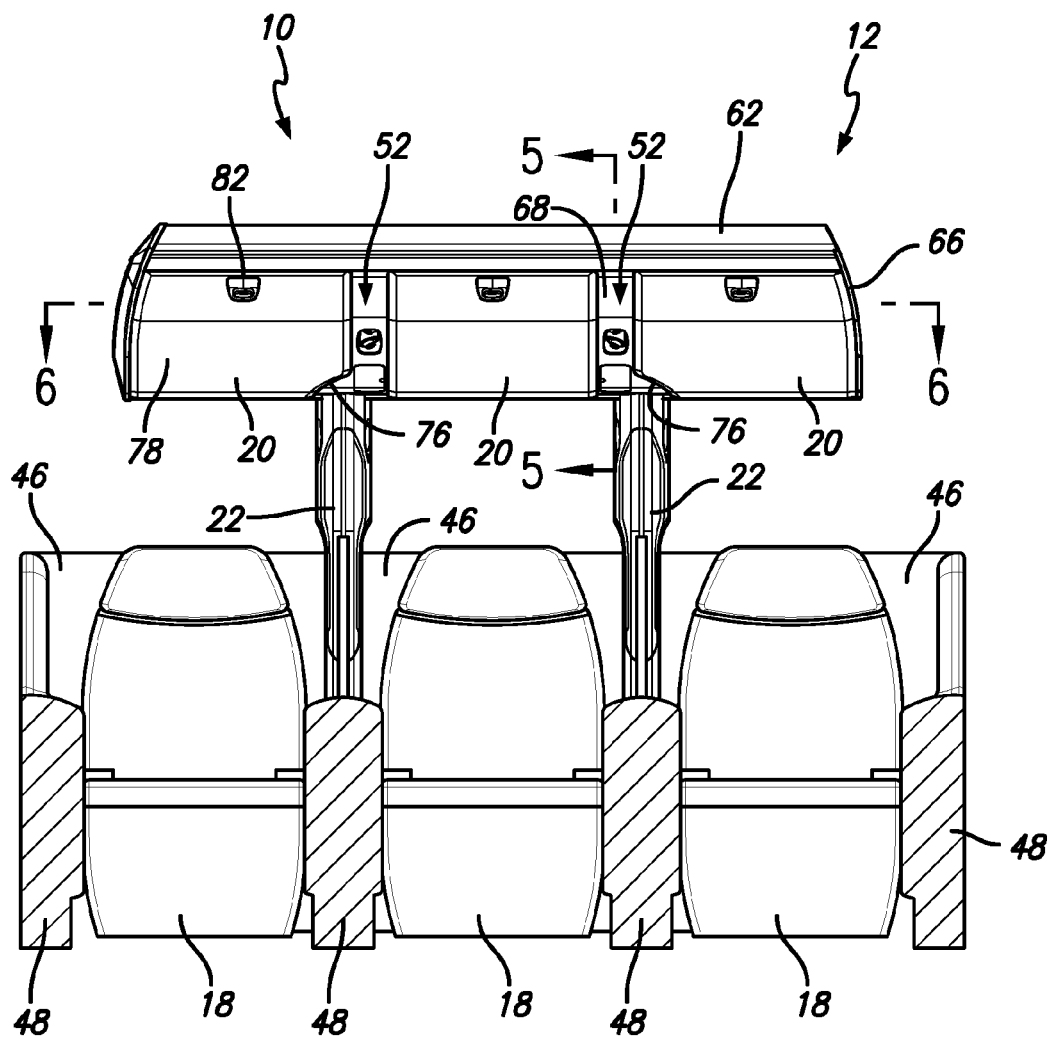
FIG. 4 is a front elevational view of one of the lounge assemblies of FIG. 1 with a portion of the seat shells shown in cross section.
Figure 6:
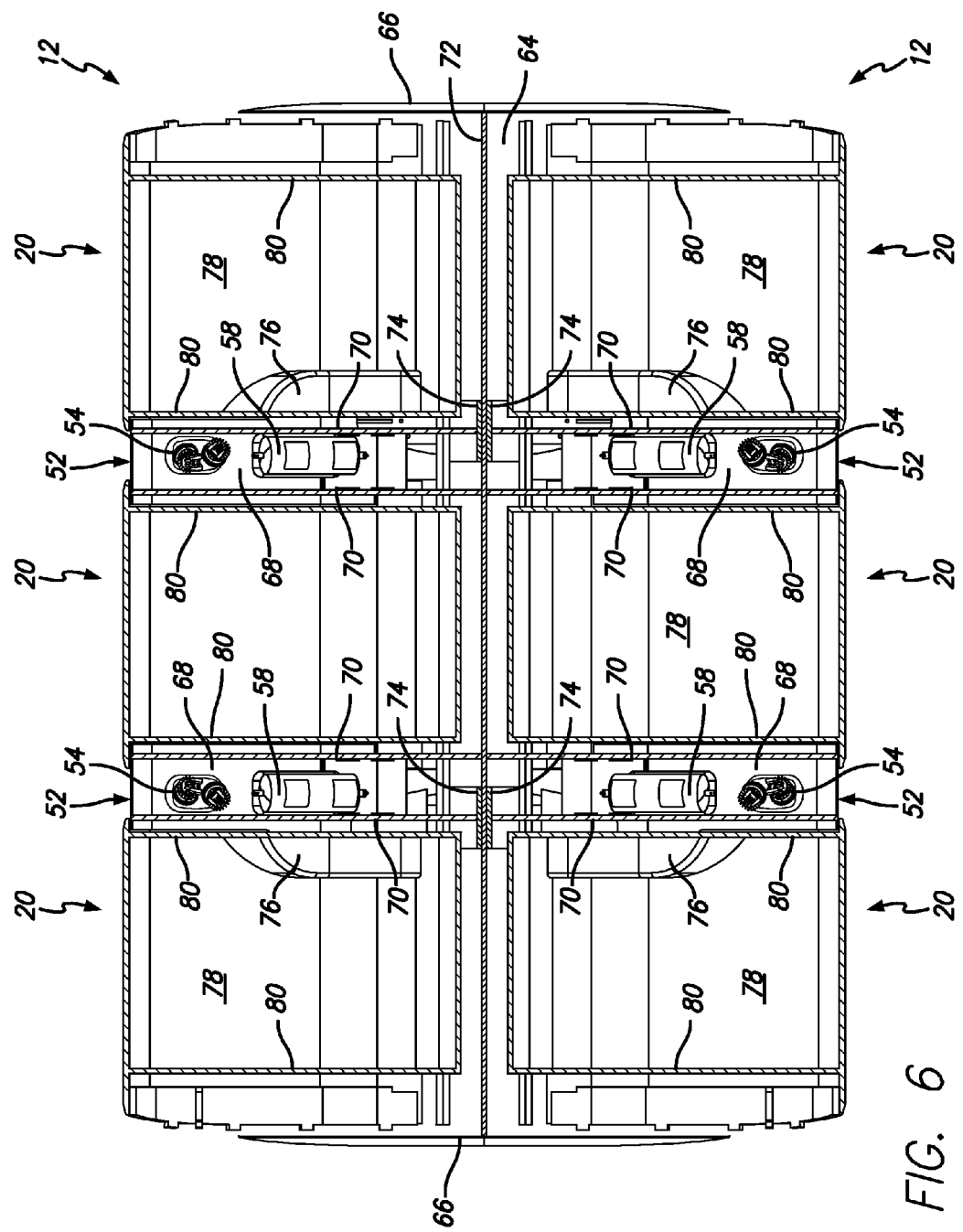
FIG. 6 is a top plan cross section of a portion of the overhead bin assembly of FIG. 2 taken along line 6-6 of FIG. 4.

As is shown in FIG. 2, overhead bin assembly 12 includes two posts 22 that support the overhead bins 20 and the necessary components therefore. In a preferred embodiment, the posts 22 include struts 51 to provide further columnar support and to help prevent the overhead bin assembly 12 from tipping over. Generally, as is best shown in FIG. 6, overhead bin assembly 12 includes six overhead storage bins 20 with four passenger service units 52 disposed between overhead storage bins 20. The passenger service units 52 include gaspers 54, masks 56, a cover 57 for the masks, and oxygen units 58. In another embodiment, the passenger service units 52 can include passenger reading lights. However, in the embodiment shown in the figures, the passenger reading lights 60 are mounted on the posts 22, as shown in FIG. 3. The passenger service units 52 can also include other components or features known in the art, such as flight attendant call buttons, etc. In a preferred embodiment, the wiring, air ducts and other components necessary for the operation of the passenger service unit components and lights, run up and through the posts 22. In another embodiment, they can extend from the inner side wall into the outboard most end wall.

As shown in FIGS. 2-3 and 6, overhead bin assembly 12 includes an upper housing 62, lower housing 64, end walls 66, passenger service unit covers 68, dividers 70, and a center wall 72 (this entire structure is referred to herein as the overhead bin housing 71). It will be understood that center wall 72 can be a single piece, as shown in FIG. 6 or two separate pieces (as shown in FIG. 7) secured to one another or backed up to one another. In other words, the entire overhead bin assembly 12 can be constructed as one unit or it can be constructed as two separate overhead bin assemblies 12a placed back to back (whether secured to one another or not).

Figure 5:
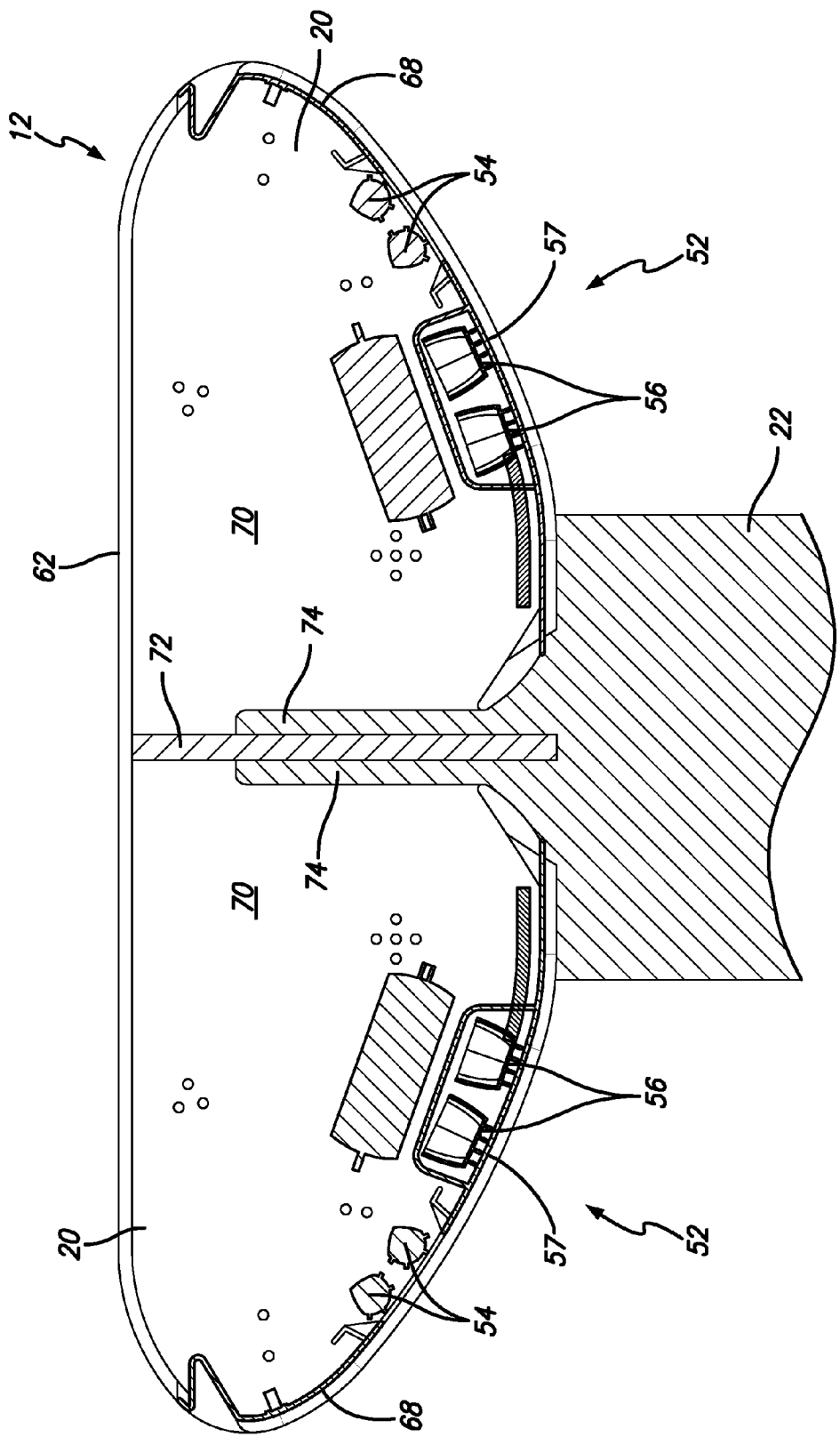
FIG. 5 is an end elevational cross section of a portion of the overhead bin assembly of FIG. 2 taken along line 5-5 of FIG. 4.

As shown in FIGS. 3 and 5, in a preferred embodiment, the post 22 includes two extension members 74 that extend upwardly into the interior of the overhead bin housing 71 on either side of the center wall 72. In other words, the extension members 74 define a space therebetween, which receives center wall 72. The extension members 74 are secured to the center wall 72 to provide support for the overhead bin housing 71 and overhead storage bins 20. As shown in FIGS. 3 and 6, the passenger service unit cover 68 includes a cut out 84 therein in which a portion of the post 22 is received. As shown in FIG. 6, the lower housing 54 includes a number of different pieces. However, this is not a limitation on the present invention. The passenger service unit 52 is housed or defined by the passenger service unit cover 68, a divider 70 on either side, and the upper housing 62. In another embodiment, a passenger service unit 52 can be located adjacent the end wall 66.

As shown in FIG. 6, each overhead storage bin 20 includes a bin housing 78, side walls 80 and a latch system 82 (see FIG. 2). In a preferred embodiment, the outside bins include clearance members 76 that provide clearance with the posts 22 when the bins 20 are opened and closed. The clearance members 76 extend into the interior of the outside overhead storage bins 20 and are generally arc shaped.

Although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention. It will be understood that generally, the invention is laterally positioned personal overhead storage space (such that it opens toward the front or rear of the aircraft) that is supported by the floor of an aircraft. The structure that supports the overhead bin may be one or posts, one or more seat shells, walls, monuments, etc. Accordingly, in a broadest sense, an embodiment can include a single post, secured to the floor of the aircraft that positions an overhead storage bin above a passenger. In another embodiment, the overhead storage bin may be positioned over the passenger seat by the seat shell. In another embodiment, the lounge assembly can comprise a single seat or single seat shell and seat with two posts that extend up to and support a single overhead storage bin. In other embodiments, the overhead bin can be supported from the floor and also from above, to provide extra support. The number of bins and number of posts is not a limitation on the present invention. Furthermore, the type of aircraft or plane is not a limitation on the present invention. The aircraft shown in the figures is a wide body aircraft. The present invention can also be used with a narrow body aircraft. For example, in a narrow body aircraft, the lounge assemblies may only include two seat shells and two overhead storage bins on each side of the aircraft.

In an embodiment, the seat shells can include walls that extend high enough to support the overhead bin above the seat. The seat shell is secured to the floor of the fuselage of the aircraft. Therefore, the overhead bin is ultimately secured to the floor of the aircraft.

In another embodiment, the seat shells 24 can be omitted and the overhead bin assemblies 12 can be used with stand alone seats 18. Furthermore, the type of seat shell 24 is not a limitation on the present invention. It will be understood that the bin does not have to be a pivot bin. It can be a moving bin or other type of articulating bin, as is known in the art.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively.

The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements or dimensions described or used herein are merely exemplary and not a limitation on the present invention. Other measurements or dimensions are within the scope of the invention.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112,¶6 will include the words "means for"). Accordingly, the applicant reserves the right to add additional claims after filing the application to pursue such additional claim forms for other aspects of the disclosure.

What is claimed is:

1. An aircraft comprising
   a fuselage having an inner side wall and a floor that includes seat tracks,
   first and second seats each having an upper portion, wherein the first and second seats are secured to the floor via the seat tracks,
   at least a first laterally extending overhead storage bin positioned generally above the upper portion of the first seat, and
   support structure secured to the floor via the seat tracks and supporting the first overhead storage bin, wherein at least a portion of the support structure is positioned between the first and second seats,
   wherein the first overhead storage bin has an open and a closed configuration, wherein the first overhead storage bin opens toward the front or the rear of the aircraft;
   the second seat having an upper portion, wherein the second seat is secured to the floor via the seat track and is adjacent the first seat,
   a second laterally extending overhead storage bin, supported by the support structure, and positioned generally above the upper portion of the second seat and adjacent the first overhead storage bin,
   wherein the second overhead storage bin has an open and a closed configuration, wherein the second overhead storage bin opens toward the front or the rear of the aircraft.

2. The aircraft of claim 1 wherein the first and second overhead storage bins are not secured to the inner side wall.

3. A lounge assembly configured to be positioned in the interior of an aircraft, the lounge assembly comprising:
   first and second seat shells that are each configured to at least partially surround a passenger seat, and
   an overhead storage bin assembly that includes
   first and second posts configured to be secured to seat tracks on a floor of the aircraft, wherein one of the first and second posts is positioned generally between the first and second seat shells and
   an overhead bin housing supported by the first and second posts, wherein the overhead bin housing includes at least a first overhead storage bin that is positioned generally above the first seat shell;
   wherein the overhead bin housing includes a second overhead storage bin positioned on one side of the first overhead storage bin and a third overhead storage bin positioned on the opposite side of the first overhead storage bin, whereby when the lounge assembly is positioned in the interior of an aircraft, the first, second and third storage bins face forward,
   further comprising the second seat shell positioned on one side of the first seat shell and a third seat shell positioned on the opposite side of the first seat shell, wherein the second overhead storage bin is positioned generally above the second seat shell and the third overhead storage bin is positioned generally above the third seat shell.

4. The lounge assembly of claim 3 wherein the overhead bin housing includes fourth, fifth and sixth overhead storage bin assemblies, whereby when the lounge assembly is positioned in the interior of an aircraft, the fourth, fifth and sixth storage bins face aft.

5. The lounge assembly of claim 4 further comprising fourth, fifth and sixth seat shells, wherein the fourth overhead storage bin is positioned generally above the fourth seat shell, the fifth overhead storage bin is positioned generally above the fifth seat shell, and the sixth overhead storage bin is positioned generally above the sixth seat shell.

6. The lounge assembly of claim 3 wherein the overhead bin housing includes first and second passenger service units, wherein the first passenger service unit is positioned between the first and second overhead storage bins and the second passenger service unit is positioned between the first and third overhead storage bins.

7. The lounge assembly of claim 6 wherein the passenger service units include at least one gasper, and wherein a passenger reading light is mounted on at least one of the first and second posts.

8. An overhead storage bin assembly configured to be positioned in the interior of an aircraft, the overhead storage bin assembly comprising:
   first and second posts configured to be secured to seat tracks on a floor of the aircraft, and
   an overhead bin housing supported by the first and second posts, wherein the overhead bin housing includes first, second and third overhead storage bins, wherein the second overhead storage bin is positioned on one side of the first overhead storage bin and the third overhead storage bin is positioned on the opposite side of the first overhead storage bin, wherein the first overhead storage bin is positioned generally between the first and second posts, and wherein the second and third overhead storage bins are not positioned between the first and second posts, whereby when the overhead storage bin assembly is positioned in the interior of an aircraft, the first, second and third overhead storage bins are positioned generally above passenger seats.

9. The overhead storage bin assembly of claim 8 wherein when the overhead storage bin assembly is positioned in the interior of an aircraft, the first, second and third storage bins face forward.

10. The overhead storage bin assembly of claim 9 wherein the overhead bin housing includes fourth, fifth and sixth overhead storage bin assemblies, whereby when the overhead storage bin assembly is positioned in the interior of an aircraft, the fourth, fifth and sixth storage bins face aft.

11. The overhead storage bin assembly of claim 9 wherein the overhead bin housing includes first and second passenger service units, wherein the first passenger service unit is positioned between the first and second overhead storage bins and the second passenger service unit is positioned between the first and third overhead storage bins.

12. The overhead storage bin assembly of claim 11 wherein the passenger service units include at least one gasper, and wherein a passenger reading light is mounted on at least one of the first and second posts.

13. The overhead storage bin assembly of claim 10 wherein the overhead bin housing includes first, second, third and fourth passenger service units, wherein the first passenger service unit is positioned between the first and second overhead storage bins, the second passenger service unit is positioned between the first and third overhead storage bins, the third passenger service unit is positioned between the fourth and fifth overhead storage bins and the fourth passenger service unit is positioned between the fourth and sixth overhead storage bins.

14. The lounge assembly of claim 3 wherein the first and second posts each include an attachment foot that is configured to be secured to the seat tracks.

15. The overhead storage bin assembly of claim 8 wherein the first and second posts each include an attachment foot that is configured to be secured to the seat tracks.

* * * * *